(12) United States Patent
Asghari-Kamrani et al.

(10) Patent No.: US 8,266,432 B2
(45) Date of Patent: *Sep. 11, 2012

(54) CENTRALIZED IDENTIFICATION AND AUTHENTICATION SYSTEM AND METHOD

(76) Inventors: Nader Asghari-Kamrani, Centreville, VA (US); Kamran Asghari-Kamrani, Centreville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/210,926

(22) Filed: Sep. 15, 2008

(65) Prior Publication Data

US 2009/0013182 A1 Jan. 8, 2009

Related U.S. Application Data

(63) Continuation of application No. 11/239,046, filed on Sep. 30, 2005, now Pat. No. 7,444,676, which is a continuation of application No. 09/940,635, filed on Aug. 29, 2001, now Pat. No. 7,356,837.

(60) Provisional application No. 60/615,603, filed on Oct. 5, 2004.

(51) Int. Cl.
*H04L 29/06* (2006.01)
*G06Q 20/00* (2012.01)

(52) U.S. Cl. ............ 713/168; 713/184; 705/67; 705/74; 705/78

(58) Field of Classification Search .................... 726/21, 726/2–5, 212, 8, 18, 27, 28; 713/155, 168, 713/170, 182–186; 705/35, 39, 44, 50, 64, 705/67, 72, 76, 78
See application file for complete search history.

(56) References Cited

U.S. PATENT DOCUMENTS

| | | | |
|---|---|---|---|
| 4,747,050 A | 5/1988 | Brachtl et al. | |
| 4,965,568 A | 10/1990 | Atalla et al. | |
| 5,535,276 A * | 7/1996 | Ganesan | 713/155 |
| 5,732,137 A * | 3/1998 | Aziz | 713/155 |
| 5,883,810 A * | 3/1999 | Franklin et al. | 700/232 |
| 6,067,621 A * | 5/2000 | Yu et al. | 713/172 |
| 6,236,981 B1 * | 5/2001 | Hill | 705/67 |
| 6,338,140 B1 * | 1/2002 | Owens et al. | 713/168 |

(Continued)

*Primary Examiner* — Gilberto Barron, Jr.
*Assistant Examiner* — Abdulhakim Nobahar
(74) *Attorney, Agent, or Firm* — Michael P. Fortkort, Esq.; Michael P Fortkort PC (57) ABSTRACT

A method and system is provided by a Central-Entity, for identification and authorization of users over a communication network such as Internet. Central-Entity centralizes users personal and financial information in a secure environment in order to prevent the distribution of user's information in e-commerce. This information is then used to create digital identity for the users. The digital identity of each user is dynamic, non predictable and time dependable, because it is a combination of user name and a dynamic, non predictable and time dependable secure code that will be provided to the user for his identification. The user will provide his digital identity to an External-Entity such as merchant or service provider. The External-Entity is dependent on Central-Entity to identify the user based on the digital identity given by the user. The External-Entity forwards user's digital identity to the Central-Entity for identification and authentication of the user and the transaction. The identification and authentication system provided by the Central-Entity, determines whether the user is an authorized user by checking whether the digital identity provided by the user to the External-Entity, corresponds to the digital identity being held for the user by the authentication system. If they correspond, then the authentication system identifies the user as an authorized user, and sends an approval identification and authorization message to the External-Entity, otherwise the authentication system will not identify the user as an authorized user and sends a denial identification and authorization message to the External-Entity.

55 Claims, 5 Drawing Sheets

U.S. PATENT DOCUMENTS

| | | | |
|---|---|---|---|
| 6,529,885 B1 * | 3/2003 | Johnson | 705/64 |
| 6,715,082 B1 * | 3/2004 | Chang et al. | 726/8 |
| 7,150,038 B1 * | 12/2006 | Samar | 726/8 |
| 7,353,541 B1 * | 4/2008 | Ishibashi et al. | 726/26 |
| 7,546,274 B2 * | 6/2009 | Ingram et al. | 705/43 |
| 2002/0040346 A1 * | 4/2002 | Kwan | 705/51 |
| 2002/0046189 A1 * | 4/2002 | Morita et al. | 705/67 |
| 2002/0069174 A1 * | 6/2002 | Fox et al. | 705/52 |
| 2002/0133412 A1 * | 9/2002 | Oliver et al. | 705/26 |
| 2002/0184143 A1 * | 12/2002 | Khater | 705/39 |
| 2002/0188481 A1 * | 12/2002 | Berg et al. | 705/4 |
| 2004/0030752 A1 * | 2/2004 | Selgas et al. | 709/206 |
| 2005/0222963 A1 * | 10/2005 | Johnson | 705/67 |
| 2007/0073621 A1 * | 3/2007 | Dulin et al. | 705/50 |
| 2008/0016003 A1 * | 1/2008 | Hutchison et al. | 705/67 |
| 2010/0100724 A1 * | 4/2010 | Kaliski, Jr. | 713/155 |

* cited by examiner

CENTRALIZED IDENTIFICATION AND AUTHENTICATION SYSTEM AND METHOD

RELATED APPLICATIONS

This application is a Continuation of application Ser. No. 11/239,046, filed Sep. 30, 2005 now U.S. Pat. No. 7,444,676, with a priority of a U.S. provisional application 60/615,603, filed Oct. 5, 2004, with the same inventors and assignee. This application is also a Continuation of another U.S. application Ser. No. 09/940,635, filed Aug. 29, 2001, and patented as U.S. Pat. No. 7,356,837, on Apr. 8, 2008, titled "Centralized identification and authentication system and method", with the same inventors and assignee. Please note that the current application has the same exact specification and Figures as those submitted with the original application Ser. No. 09/940,635, filed Aug. 29, 2001.

BACKGROUND OF THE INVENTION

1. Field of the Invention

The present invention relates to a centralized identification and authentication system and method for identifying an individual over a communication network such as Internet, to increase security in e-commerce. More particularly a method and system for generation of a dynamic, non-predictable and time dependent SecureCode for the purpose of positively identifying an individual.

2. Description of the Related Art

The increasing use of the Internet and the increase of businesses utilizing e-commerce have lead to a dramatic increase in customers releasing confidential personal and financial information, in the form of social security numbers, names, addresses, credit card numbers and bank account numbers, to identify themselves. This will allow them to get access to the restricted web sites or electronically purchase desired goods or services. Unfortunately this type of identification is not only unsafe but also it is not a foot proof that the user is really the person he says he is. The effect of these increases is reflected in the related art.

U.S. Pat. No. 5,732,137 issued to Aziz outlines a system and method for providing remote user authentication in a public computer network such as the Internet. More specifically, the system and method provides for remote authentication using a one-time password scheme having a secure out-of-band channel for initial password delivery.

U.S. Pat. No. 5,815,665 issued to Teper et al. outlines the use of a system and method for enabling consumers to anonymously, securely and conveniently purchase on-line services from multiple service providers over a distributed network, such as the Internet. Specifically, a trusted third-party broker provides billing and security services for registered service providers via an online brokering service, eliminating the need for the service providers to provide these services.

U.S. Pat. No. 5,991,408 issued to Pearson, et al. outlines a system and method for using a biometric element to create a secure identification and verification system, and more specifically to an apparatus and a method for creating a hard problem which has a representation of a biometric element as its solution.

Although each of the previous patents outline a valuable system and method, what is really needed is a system and method that offers digital identity to the users and allows them to participate in e-commerce without worrying about the privacy and security. In addition to offering security and privacy to the users, the new system has to be simple for businesses to adopt and also doesn't require the financial institutions to change their existing systems. Such a secure, flexible and scalable system and method would be of great value to the businesses that would like to participate in today's electronic commerce.

None of the above inventions and patents, taken either singularly or in combination, is seen to describe the instant invention as claimed. Thus a centralized identification and authentication system and method solving the aforementioned problems is desired.

For convenience, the term "user" is used throughout to represent both a typical person consuming goods and services as well as a business consuming goods and services.

As used herein, a "Central-Entity" is any party that has user's personal and/or financial information, UserName, Password and generates dynamic, non-predictable and time dependable SecureCode for the user. Examples of Central-Entity are: banks, credit card issuing companies or any intermediary service companies.

As also used herein, an "External-Entity" is any party offering goods or services that users utilize by directly providing their UserName and SecureCode as digital identity. Such entity could be a merchant, service provider or an online site. An "External-Entity" could also be an entity that receives the user's digital identity indirectly from the user through another External-Entity, in order to authenticate the user, such entity could be a bank or a credit card issuing company.

The term "UserName" is used herein to denote any alphanumeric name, id, login name or other identification phrase, which may be used by the "Central-Entity" to identify the user.

The term "Password" is used herein to denote any alphanumeric password, secret code, PIN, prose phrase or other code, which may be stored in the system to authenticate the user by the "Central-Entity".

The term "SecureCode" is used herein to denote any dynamic, non-predictable and time dependent alphanumeric code, secret code, PIN or other code, which may be broadcast to the user over a communication network, and may be used as part of a digital identity to identify a user as an authorized user.

The term "digital identity" is used herein to denote a combination of user's "SecureCode" and user's information such as "UserName", which may result in a dynamic, non-predictable and time dependable digital identity that could be used to identify a user as an authorized user.

The term "financial information" is used herein to denote any credit card and banking account information such as debit cards, savings accounts and checking accounts.

SUMMARY OF THE INVENTION

The invention relates to a system and method provided by a Central-Entity for centralized identification and authentication of users and their transactions to increase security in e-commerce. The system includes:

A Central-Entity: This entity centralizes users personal and financial information in a secure environment in order to prevent the distribution of user's information in e-commerce. This information is then used to create digital identity for the users. The users may use their digital identity to identify themselves instead of providing their personal and financial information to the External-Entities;

A plurality of users: A user represents both a typical person consuming goods and services as well as a business consuming goods and services, who needs to be identified in order to make online purchases or to get access to the restricted web sites. The user registers at the Central-Entity to receive his digital identity, which is then provided to the External-Entity for identification;

A plurality of External-Entities: An External-Entity is any party offering goods or services in e-commerce and needs to authenticate the users based on digital identity.

The user signs-up at the Central-Entity by providing his personal or financial information. The Central-Entity creates a new account with user's personal or financial information and issues a unique UserName and Password to the user. The user provides his Username and Password to the Central-Entity for identification and authentication purposes when accessing the services provided by the Central-Entity. The Central-Entity also generates dynamic, non-predictable and time dependent SecureCode for the user per user's request and issues the SecureCode to the user. The Central-Entity maintains a copy of the SecureCode for identification and authentication of the user's digital identity. The user presents his UserName and SecureCode as digital identity to the External-Entity for identification. When an External-Entity receives the user's digital identity (UserName and SecureCode), the External-Entity will forward this information to the Central-Entity to identify and authenticate the user. The Central-Entity will validate the information and sends an approval or denial response back to the External-Entity.

There are also communications networks for the user, the Central-Entity and the External-Entity to give and receive information between each other.

This invention also relates to a system and method provided by a Central-Entity for centralized identification and authentication of users to allow them access to restricted web sites using their digital identity, preferably without revealing confidential personal or financial information.

This invention further relates to a system and method provided by a Central-Entity for centralized identification and authentication of users to allow them to purchase goods and services from an External-Entity using their digital identity, preferably without revealing confidential personal or financial information.

Accordingly, it is a principal object of the invention to offer digital identity to the users for identification in e-commerce.

It is another object of the invention to centralize user's personal and financial information in a secure environment.

It is another object of the invention to prevent the user from distributing their personal and financial information.

It is a further object of the invention to keep merchants, service providers, Internet sites and financial institutions satisfied by positively identifying and authenticating the users.

It is another object of the invention to reduce fraud and increase security for e-commerce.

It is another object of the invention to allow businesses to control visitor's access to their web sites.

It is another object of the invention to protect the customer from getting bills for goods and services that were not ordered.

It is another object of the invention to increase customers' trust and reduce customers' fear for e-commerce.

It is another object to decrease damages to the customers, merchants and financial institutions.

It is an object of the invention to provide improved elements and arrangements thereof for the purposes described which are inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
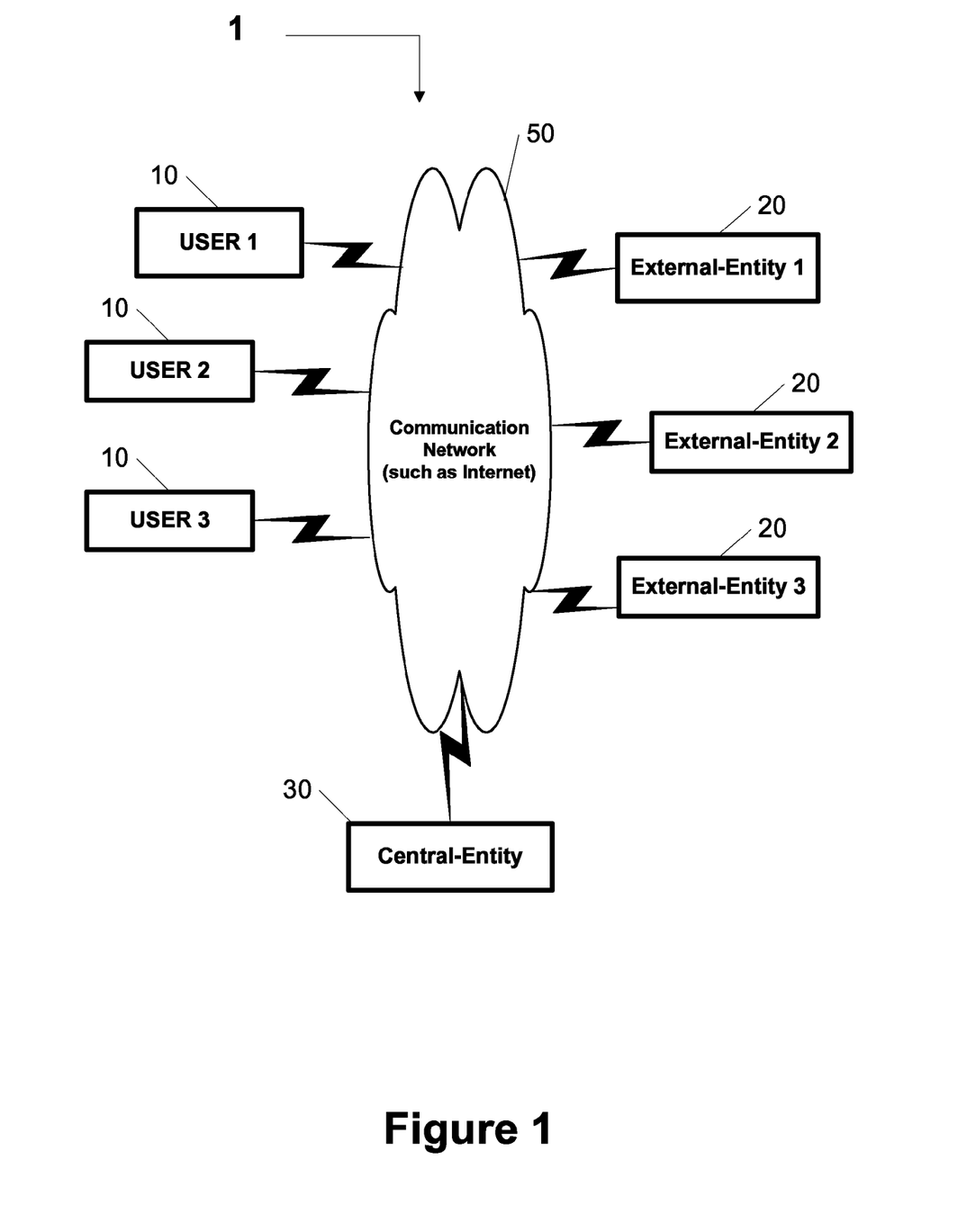
FIG. 1 is a high-level overview of a centralized identification and authentication system and method according to the present invention.

The invention relates to a system 1 and method 2 to identify and authenticate the users and their transactions to increase security in e-commerce. FIG. 1 illustrates a system to positively identify the users 10 in e-commerce based on digital identity.

The system 1 comprises a plurality of users 10, a plurality of External-Entities 20 with goods and services that are desired by the users 10 and a Central-Entity 30 providing a unique UserName and Password to the users 10 and generating dynamic, non-predictable and time dependent SecureCode for the users 10 per user's request. There are also communication networks 50 for the user 10, the Central-Entity 30 and the External-Entity 20 to give and receive information between each other.

It would be desirable to develop a new system 1 and method 2 to centralize user's personal and financial information in a secure environment and to offer digital identity to the users 10 in order to provide privacy, increase security and reduce fraud in e-commerce. Ideally, a secure identification and authentication system 1 would identify legitimate users 10 and unauthorized users 10. This would increase the user's trust, which leads to more sales and cash flow for the merchants/service providers.

The present invention relates to a system 1 and method 2 to support this ideal identification and authentication system. For identification purpose, a digital identity (a unique UserName and a dynamic, non-predictable and time dependent SecureCode) is used by the user 10 at the time of ordering or at the time of accessing a restricted Internet site. A series of steps describing the overall method are conducted between the users 10, the Central-Entity 30 and the External-Entity 20 and are outlined in FIG. 3,4,5.

Figure 2:
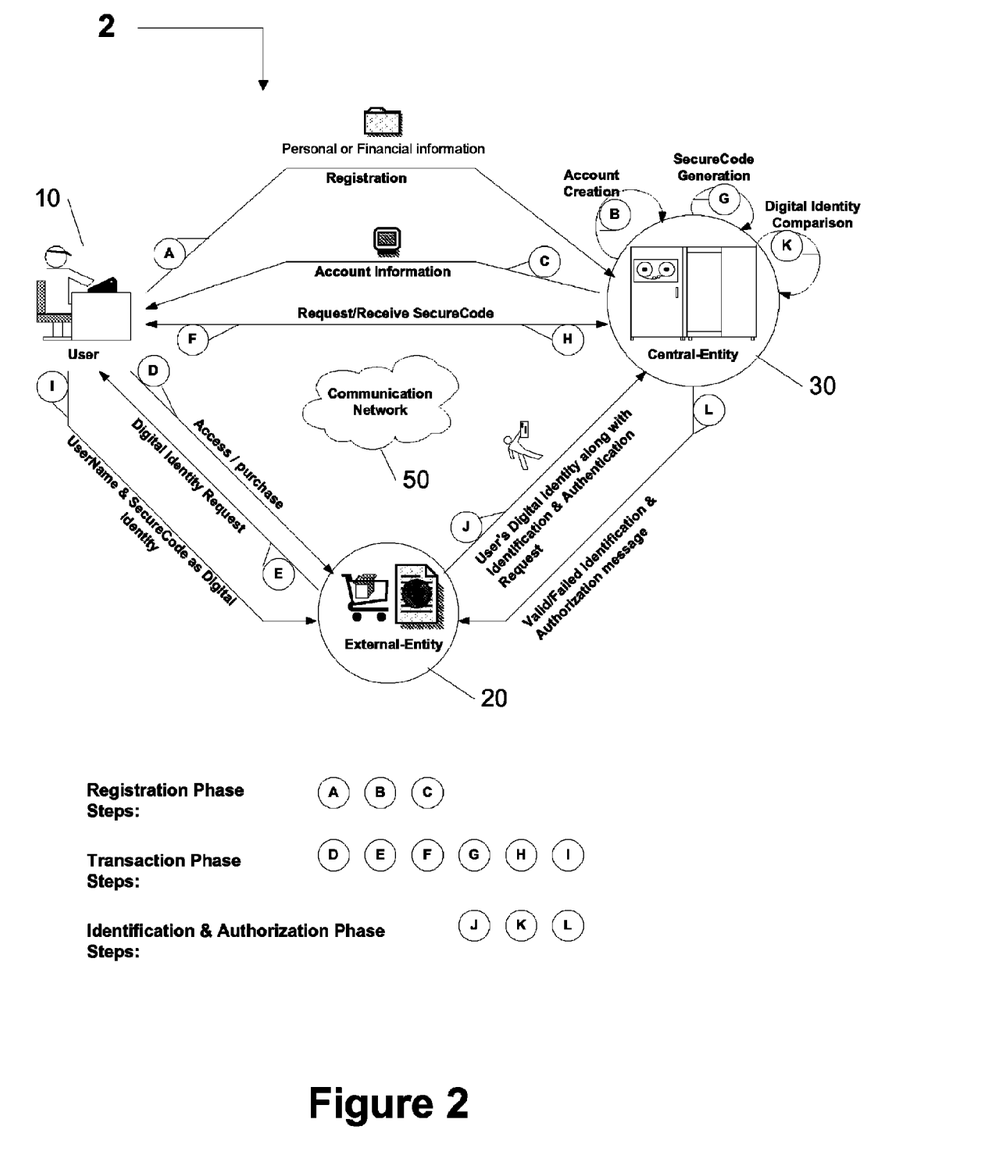
FIG. 2 is a detailed overview of a centralized identification and authentication system and method according to the present invention.
Figure 3:
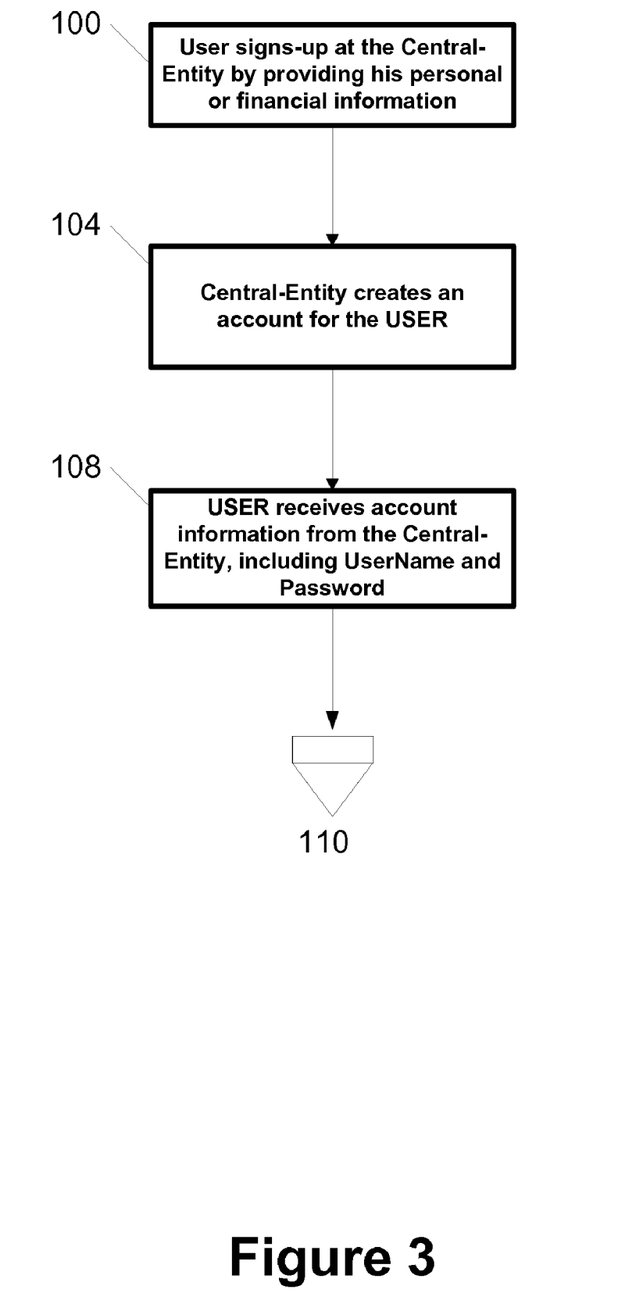
FIG. 3 is a block diagram of the registration of a customer utilizing a centralized identification and authentication system and method according to the present invention.

There are three distinct phases involved in using the centralized identification and authentication system FIG. 2, the first of which being the registration phase, which is depicted in FIG. 3. During the registration phase, the user 10 provides his personal or financial information to the Central-Entity 30. The user 10 registers at the Central-Entity 30, 100, 104 and receives his account and login information such as UserName and Password 108. User 10 can access his account at any time by accessing the Central-Entity's system using a communication network 50 and logging into the system.

Figure 4:
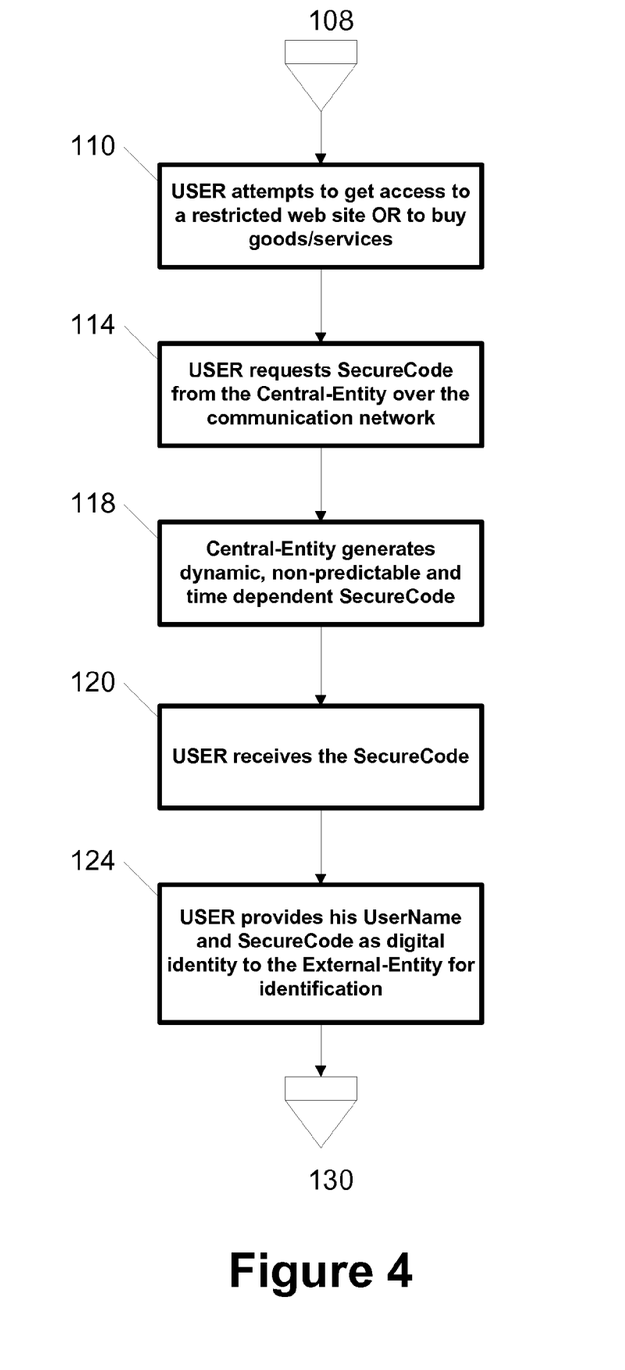
FIG. 4 is a block diagram of the transaction of a customer utilizing a centralized identification and authentication system and method according to the present invention.

Next is the transaction phase, where the user 10 attempts to access a restricted web site or attempts to buy services or products 110, as illustrated in FIG. 4, through a standard interface provided by the External-Entity 20, similar to what exists today and selects digital identity as his identification and authorization or payment option. The External-Entity 20 displays the access or purchase authorization form requesting the user 10 to authenticate himself using his UserName and SecureCode as digital identity. The user 10 requests Secure-Code from the Central-Entity 30 by accessing his account over the communication network 50, 114. The Central-Entity 30 generates dynamic, non-predictable and time dependable SecureCode 118 for the user 10. The Central-Entity 30 maintains a copy of the SecureCode for identification and authentication of the user 10 and issues the SecureCode to the user 10. When the user 10 receives the SecureCode 120, the user 10 provides his UserName and SecureCode as digital identity to the External-Entity 20, 124, FIG. 4.

Figure 5:
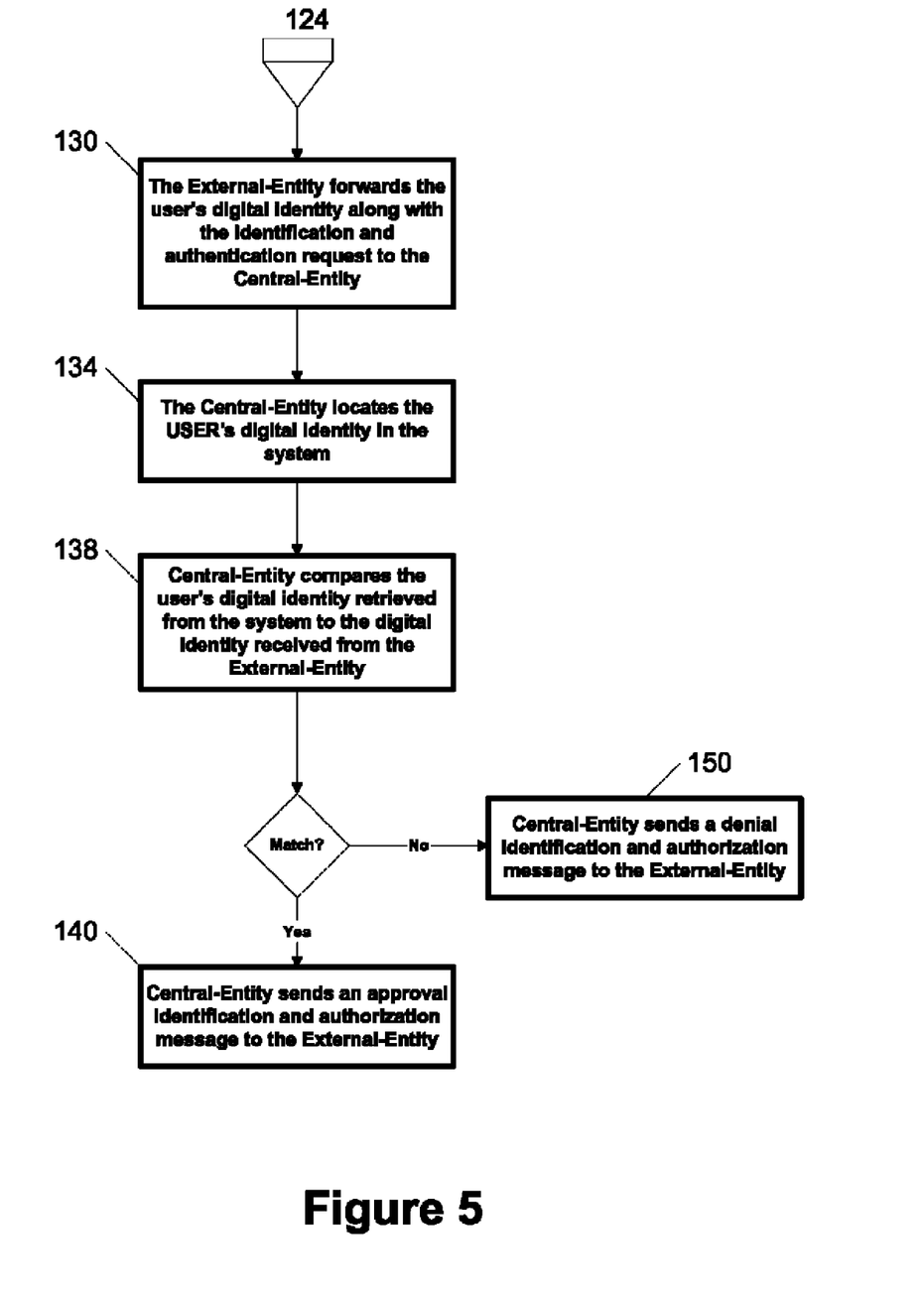
FIG. 5 is a block diagram of a Central-Entity authorizing a user utilizing a centralized identification and authentication system and method according to the present invention.

The third phase is identification and authorization phase. Once the user 10 provides his digital identity to the External-Entity 20, the External-Entity 20 forwards user's digital identity along with the identification and authentication request to the Central-Entity 30, 130, as illustrated in FIG. 5. When the Central-Entity 30 receives the request containing the user's digital identity, the Central-Entity 30 locates the user's digital identity (UserName and SecureCode) in the system 134 and compares it to the digital identity received from the External-Entity 20 to identify and validate the user 10, 138. The Central-Entity 30 generates a reply back to the External-Entity 20 via a communication network 50 as a result of the comparison. If both digital identities match, the Central-Entity 30 will identify the user 10 and will send an approval of the identification and authorization request to the External-Entity 20, 140, otherwise will send a denial of the identification and authorization request to the External-Entity 20, 150. The External-Entity 20 receives the approval or denial response in a matter of seconds. The External-Entity 20 might also display the identification and authentication response to the user 10.

To use the digital identity feature, the Central-Entity 30 provides the authorized user 10 the capability to obtain a dynamic, non-predictable and time dependable SecureCode. The user 10 will provide his UserName and SecureCode as digital identity to the External-Entity 20 when this information is required by the External-Entity 20 to identify the user 10.

The Central-Entity 30 may add other information to the SecureCode before sending it to the user 10, by algorithmically combining SecureCode with user's information such as UserName. The generated SecureCode will have all the information needed by the Central-Entity 30 to identify the user 10. In this case the user will only need to provide his Secure-Code as digital identity to the External-Entity 20 for identification.

In the preferred embodiment, the user 10 uses the communication network 50 to receive the SecureCode from the Central-Entity 30. The user 10 submits the SecureCode in response to External-Entity's request 124. The SecureCode is preferably implemented through the use of an indicator. This indicator has two states: "on" for valid and "off" for invalid. When the user 10 receives the SecureCode, the SecureCode is in "on" or "valid" state. The Central-Entity 30 may improve the level of security by invalidating the SecureCode after it's use. This may increase the level of difficulty for unauthorized user. Two events may cause a valid SecureCode to become invalid:

1. Timer event: This event occurs when the predefined time passes. As mentioned above the SecureCode is time dependent.

2. Validation event: This event occurs when the Secure-Code forwarded to the Central-Entity 30 (as part of digital identity) corresponds to the user's SecureCode held in the system. When this happens the Central-Entity 30 will invalidate the SecureCode to prevent future use and sends an approval identification and authorization message to the External-Entity 20,140.

A valid digital identity corresponds to a valid SecureCode. When the SecureCode becomes invalid, the digital identity will also become invalid.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. A method for authenticating a user during an electronic transaction between the user and an external-entity, the method comprising:

receiving electronically a request for a dynamic code for the user by a computer associated with a central-entity during the transaction between the user and the external-entity;

generating by the central-entity during the transaction a dynamic code for the user in response to the request, wherein the dynamic code is valid for a predefined time and becomes invalid after being used;

providing by the computer associated with the central-entity said generated dynamic code to the user during the transaction;

receiving electronically by the central-entity a request for authenticating the user from a computer associated with the external-entity based on a user-specific information and the dynamic code as a digital identity included in the request which said dynamic code was received by the user during the transaction and was provided to the external-entity by the user during the transaction; and authenticating by the central-entity the user and providing a result of the authenticating to the external-entity during the transaction if the digital identity is valid.

2. A method as recited in claim 1, further comprising:

combining said generated dynamic code with the user-specific information using a predetermined algorithm to form a combined dynamic code and user specific information;

maintaining the combined dynamic code and user specific information at the central-entity;

comparing the combined dynamic code and user specific information with a received combined dynamic code and user specific information to validate the user.

3. The method of claim 1, wherein the user specific information comprises one or more of the following: an alphanumeric name, an ID, a login name, and an identification phrase.

4. The method of claim 1, wherein the transaction corresponds to a financial transaction.

5. The method of claim 1, wherein the transaction corresponds to a non-financial transaction.

6. The method of claim 1, wherein the transaction corresponds to access to restricted web-site or restricted computer/server.

7. The method of claim 1, wherein said transaction occurs over a communication network, wherein said communication network comprises one or more of the following: a public network, the Internet, a wireless network, a mobile network, a satellite network, and a private network.

8. The method of claim 1, wherein said transaction occurs over a communication network to which is coupled said user, said central-entity, and said external-entity.

9. A method as recited in claim 2, wherein said algorithmically combined dynamic code and user specific information is used to authenticate a user's identity.

10. A method as recited in claim 2, wherein said central-entity is using said algorithmically combined dynamic code and user specific information to authenticate a user's identity.

11. A method as recited in claim 1, wherein said external-entity and said central-entity are the same entity.

12. The method as recited in claim 1, wherein said central-entity invalidates the dynamic code after authenticating the user.

13. The method as recited in claim 1, wherein the central-entity invalidates the dynamic code after a predefined period of time passes from when the dynamic code was generated.

14. The method as recited in claim 1, wherein said central-entity generates the dynamic code with dependence on the user information.

15. The method as recited in claim 14, wherein said user information comprises one or more of the following: an alphanumeric name, an ID, a login name, and an identification phrase.

16. The method as recited in claim 1, wherein said user communicates with said central-entity over a communication network.

17. The method as recited in claim 1, wherein said user communicates with said external-entity over a communication network.

18. The method as recited in claim 1, wherein said dynamic code is generated based on a request submitted by said user over a communication network.

19. The method as recited in claim 18, wherein said request is initiated by said user through a standard interface provided to said user.

20. A method as recited in claim 1, wherein said digital identity is invalid if the dynamic code is invalid.

21. A method as recited in claim 1, wherein said digital identity is valid if at least the dynamic code is valid.

22. A method as recited in claim 1, wherein said external-entity authenticates the user upon receiving an affirmation authentication message from the central-entity.

23. A method as recited in claim 1, wherein said external-entity authenticates the user if said central-entity authenticates the user based on the dynamic code.

24. The method of claim 1, wherein the user-specific information includes user-identifying information.

25. An apparatus for authenticating a user during an electronic transaction with an external-entity, the apparatus comprising:
 a first central-entity computer adapted to:
  generate a dynamic code for the user in response to a request during the electronic transaction, wherein the dynamic code is valid for a predefined time and becomes invalid after being used; and
  provide said dynamic code to the user during the electronic transaction;
 a second central-entity computer adapted to validate a digital identity in response to an authentication request from the external-entity, which authentication request includes a user-specific information and the dynamic code as the digital identity which dynamic code was received by the user during the electronic transaction and was provided to the external-entity by the user during the electronic transaction, and to authenticate the user if the digital identity is valid and to provide a result of the authentication of the user to the external-entity during the electronic transaction.

26. The apparatus as recited in claim 25, wherein said user has a pre-existing relationship with the external-entity.

27. The apparatus as recited in claim 25, wherein said user has no pre-existing relationship with the external-entity.

28. The apparatus as recited in claim 25, wherein said external-entity and said central-entity use a dynamic code that is algorithmically combined with said the user-specific information.

29. The apparatus of claim 25, wherein the transaction corresponds to a financial transaction.

30. The apparatus of claim 25, wherein the transaction corresponds to a non-financial transaction.

31. The apparatus of claim 25, wherein the transaction corresponds to access to restricted web-site or restricted computer/server.

32. The apparatus of claim 25, wherein said transaction occurs over a communication network and wherein said communication network comprises one or more of the following: a public network, the Internet, a wireless network, a mobile network, a satellite network, and a private network.

33. The apparatus of claim 25, wherein said transaction occurs over a communication network to which is coupled said user, said central-entity, and said external-entity.

34. The apparatus as recited in claim 25, wherein said user communicates with said central-entity over a communication network.

35. The apparatus as recited in claim 25, wherein said user communicates with said external-entity over a communication network.

36. The apparatus according to claim 25, wherein said first central-entity computer and said second central-entity computer are the same.

37. The apparatus according to claim 25, wherein said first central-entity computer and said second central-entity computer are different.

38. The apparatus of claim 25, wherein said digital identity is invalid if the dynamic code is invalid.

39. The apparatus of claim 25, wherein said digital identity is valid if at least the dynamic code is valid.

40. The apparatus of claim 25, wherein said external-entity authenticates the user upon receiving an affirmation authentication message from the central-entity.

41. The apparatus of claim 25, wherein said central-entity invalidates the dynamic code after authenticating the user.

42. The apparatus of claim 25, wherein the central-entity invalidates the dynamic code after a predefined period of time passes after the dynamic code was generated.

43. The apparatus of claim 25, wherein said central-entity generates the dynamic code based on said user-specific information.

44. The apparatus of claim 43, wherein said user-specific information comprises one or more of the following: an alphanumeric name, an ID, a login name, a password, and an identification phrase.

45. The apparatus of claim 25, wherein said external-entity authenticates the user if said central-entity authenticates the user based on the dynamic code.

46. The apparatus of claim 25, wherein said external-entity and central-entity are the same entity.

47. The apparatus of claim 25, wherein the user-specific information includes user-identifying information.

48. A method for authenticating a user during an electronic transaction between the user and an external-entity, the method comprising:
- receiving electronically a request for a dynamic code for the user by a computer associated with a central-entity during the electronic transaction between the user and the external-entity;
- generating by the central-entity during the electronic transaction a dynamic code for the user in response to the request, wherein the dynamic code is valid for a predefined time and becomes invalid after being used;
- providing by a computer associated with the central-entity said generated dynamic code to the user during the transaction;
- receiving during the electronic transaction by another computer associated with the central-entity a request from the external-entity for authenticating the user based on a user-specific information and the dynamic code as a digital identity included in the request, which said dynamic code was received by the user during the transaction and was provided by the user to the external-entity during the electronic transaction; and
- authenticating by the central-entity the user and providing a result of the authentication of the user to the external-entity during the transaction if the digital identity is valid, wherein said dynamic code is alphanumeric.

49. A method as recited in claim 48, wherein said external-entity and central-entity are the same entity.

50. The method of claim 48, wherein the user-specific information includes user-identifying information.

51. The method of claim 48, wherein the user-specific information comprises one or more of the following: an alphanumeric name, an ID, a login name, and an identification phrase.

52. An apparatus for authenticating a user during an electronic transaction with an external-entity, the apparatus comprising:
- a first central-entity computer adapted to:
  - generate a dynamic code for the user in response to a request from the user during the electronic transaction, wherein the dynamic code is valid for a predefined time and becomes invalid after being used; and
  - provide said dynamic code to the user during the electronic transaction;
- a second central-entity computer adapted to validate a user-specific information and the dynamic code as a digital identity included in an authentication request from the external-entity, which said dynamic code was received by the user during the electronic transaction and was provided by the user to the external-entity during the electronic transaction, and to authenticate the user if the digital identity is valid and to provide a result of the authentication of the user to the external-entity during the electronic transaction, wherein said dynamic code is alphanumeric.

53. The apparatus of claim 52, wherein said external-entity and central-entity are the same entity.

54. The apparatus of claim 52, wherein the user-specific information includes user-identifying information.

55. The method of claim 52, wherein the user-specific information comprises one or more of the following: an alphanumeric name, an ID, a login name, and an identification phrase.

* * * * *